July 15, 1924.　　　　　　M. MATEJEWSKI　　　　　　1,501,463
ANIMAL TRAP
Filed Feb. 19, 1923　　　　3 Sheets-Sheet 1
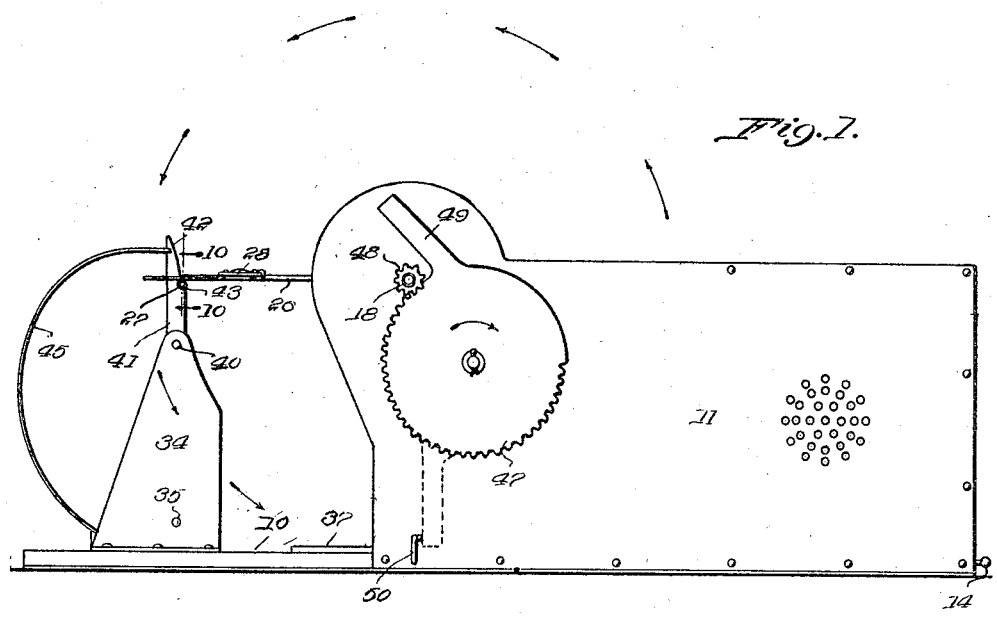
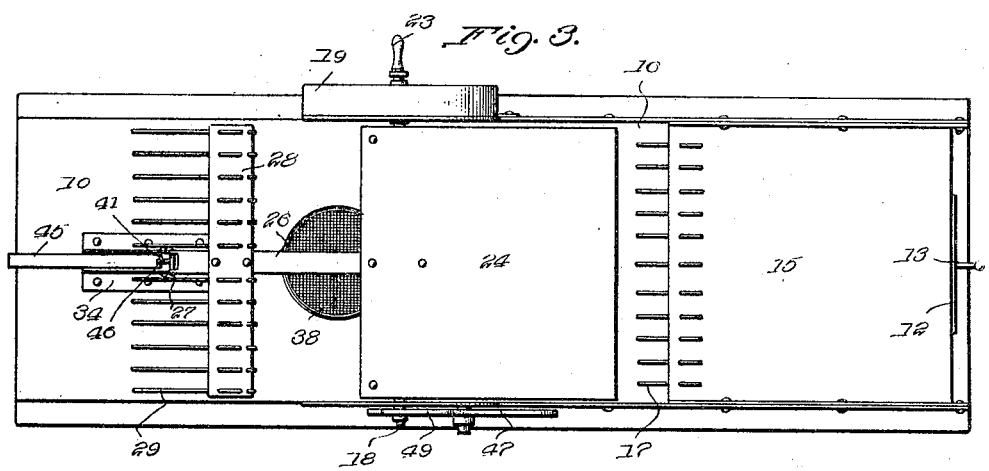
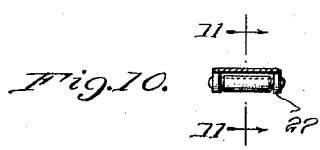
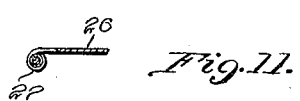
Mike Matejewski
INVENTOR
BY Victor J. Evans
ATTORNEY
WITNESS:

July 15, 1924.

M. MATEJEWSKI

ANIMAL TRAP

Filed Feb. 19, 1923

Mike Matejewski
INVENTOR

BY Victor J. Evans
ATTORNEY

WITNESS

July 15, 1924.
M. MATEJEWSKI
ANIMAL TRAP
Filed Feb. 19, 1923
1,501,463
3 Sheets-Sheet 3
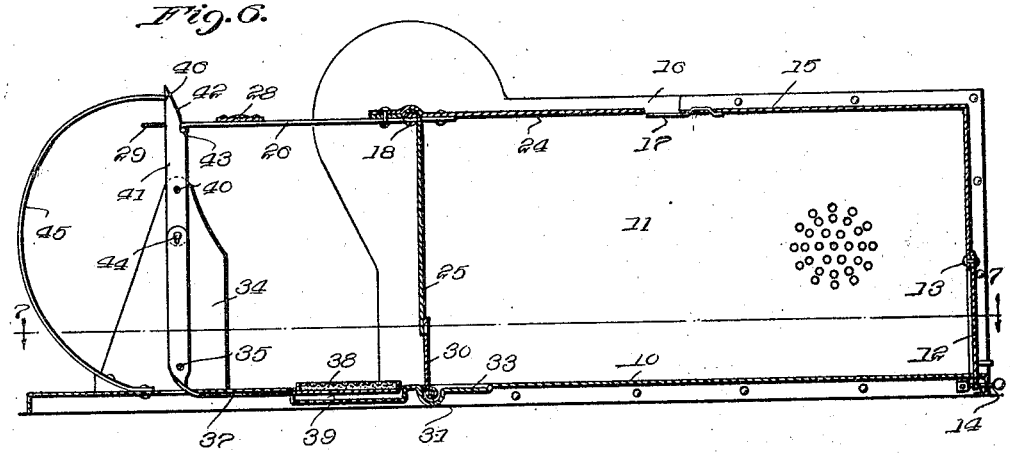
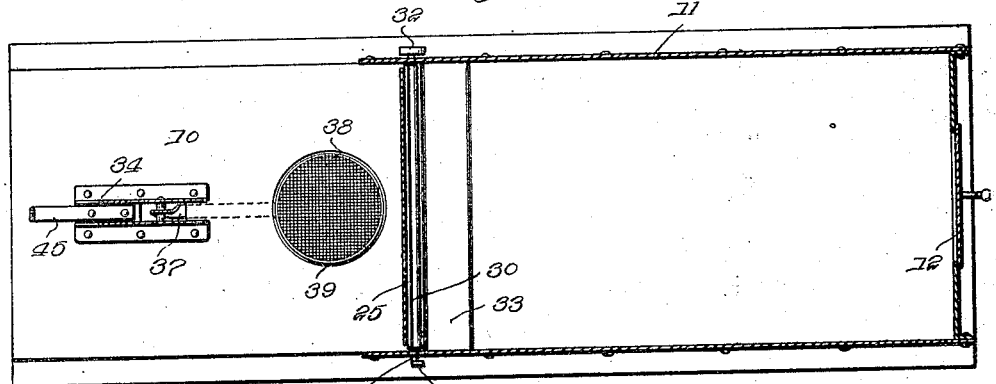
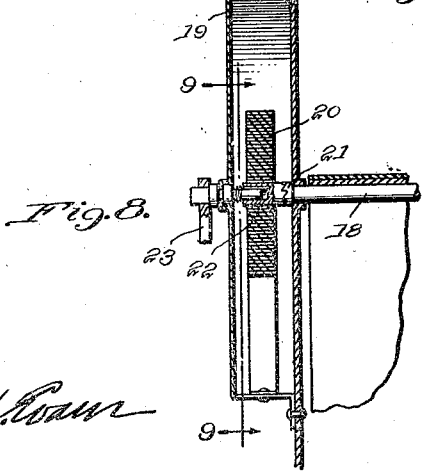
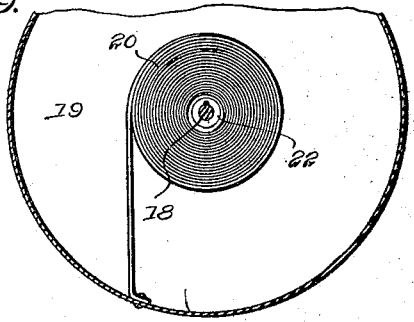
Mike Matejewski
INVENTOR
BY Victor J. Evans
ATTORNEY
WITNESS:

Patented July 15, 1924.

1,501,463

UNITED STATES PATENT OFFICE.

MIKE MATEJEWSKI, OF NORRIS, ILLINOIS.

ANIMAL TRAP.

Application filed February 19, 1923. Serial No. 620,038.

*To all whom it may concern:*

Be it known that I, MIKE MATEJEWSKI, a citizen of the United States, residing at Norris, in the county of Fulton and State of Illinois, have invented new and useful Improvements in Animal Traps, of which the following is a specification.

This invention relates to traps for mice, rats, or other animals, and even birds if desired, and has for its object the provision of a novel automatic trap which is spring operated and which catches quite a number of animals in succession, the action being such that the trapped animals are not injured but are kept alive so that they may be subsequently removed and drowned or otherwise killed, or be transferred to a cage in the event that the animals trapped are of such a nature that their continued existence is desirable.

An important object is the provision of a trap of this character which involves the use of a spring operated rotary sweep which is released by the weight of the animal upon the bait treadle and which operates to sweep the animal through a door way into the cage portion of the device.

Another object is the provision of a trap of this character provided with automatic locking means for rendering the parts absolutely inactive when the maximum number of animals has been caught so that it will be impossible for the parts to operate partially with the result that certain of the doors might be left partly open with the probability that the previously trapped animals would escape.

Still another object is the provision of a device of this character which after being initially set, requires no further attention of any kind, resetting being accomplished automatically after each animal is caught.

An additional object is the provision of a device of this character which will be simple and inexpensive to manufacture, easy and safe to set and operate, efficient and durable in use and a general improvement in the art.

With the above and other objects and advantages in view the invention consists in the details of construction to be hereinafter more fully described and claimed and illustrated in the accompanying drawings, in which:

Figure 1 is an elevation of one side of the device,

Figure 3 is a plan view,

Figure 6 is a longitudinal section taken in a vertical plane,

Figure 2:
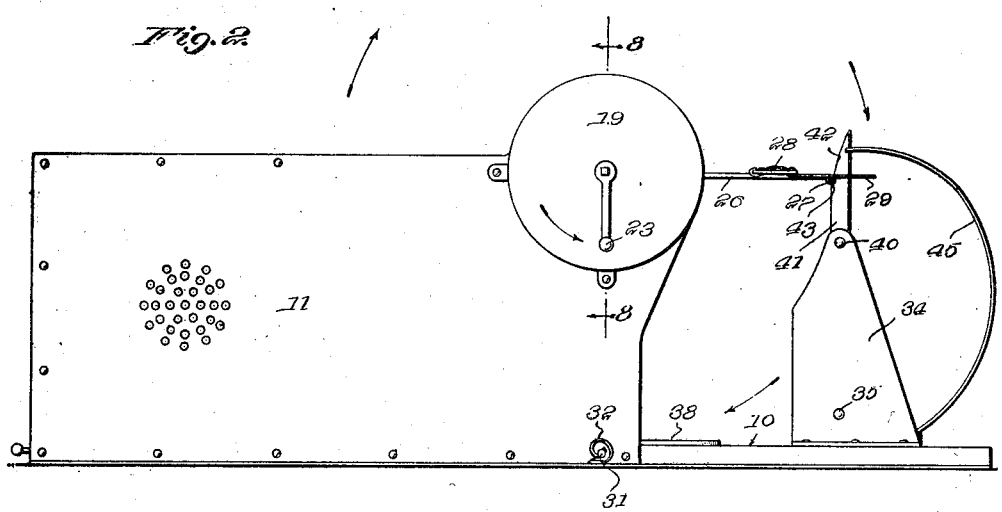
Figure 2 is an elevation of the opposite side.
Figures 4, 5:
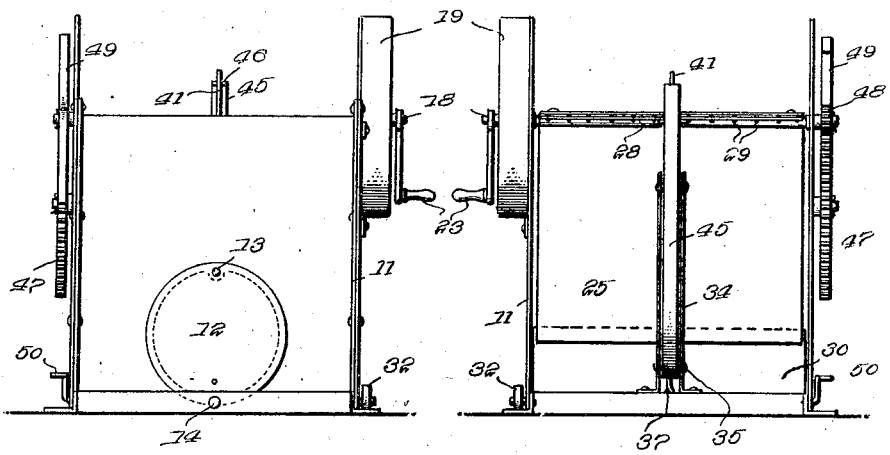
Figure 4 is a rear elevation.
Figure 5 is a front elevation.

Figure 7 is a longitudinal section taken in a horizontal plane on the line 7—7 of Figure 6, Figure 8 is a cross section taken at the front door of the device, the view being taken on the line 8—8 of Figure 2, Figure 9 is a section on the line 9—9 of Figure 8, Figure 10 is a section on the line 10—10 of Figure 1, Figure 11 is a section on the line 11—11 of Figure 10.

Referring more particularly to the drawings I have shown my device as comprising an elongated supporting base 10 upon which is mounted an elongated substantially rectangular cage 11 which may be constructed as a suitable frame covered with wire screen or which may be formed of sheet metal cut or stamped to provide perforations which will supply air to the trapped animals. It is of course necessary that this cage and in fact all the parts of the device should be constructed of metal to avoid gnawing by the rats or mice trapped and also to permit the device to be kept in a sanitary condition by being scalded or otherwise treated. The rear end of the cage is normally closed by a door 12 which is here illustrated as being hinged at 13 and provided with a suitable catch 14. The forward portion of the top 15 is cut away to define an opening 16 and at the edge of this opening are wire prongs or teeth 17 spaced apart as shown and projecting forwardly.

Journaled transversely at the upper forward end of the cage is a shaft 18 which projects through a spring box 19 mounted on one side of the cage and containing a spiral spring 20 which has one end secured to the box and its other end secured to the shaft 18. This shaft also carries a ratchet 21 co-operating with a spring pawl 22 so that by turning the shaft 18 by means of a suitable removable crank 23, the spring 20 may be placed under tension.

Rigidly carried by the shaft 18 is the door and sweep structure which includes two door members 24 and 25, the former of which normally closes the opening 16 in the top of the cage, and the latter of which normally closes the front of the cage. The sweep consists of an elongated bar 26 which extends in alignment with the door 24 and which terminates in a lip 27 for a purpose to be described. The bar 26 carries a cross bar 28 on which are mounted wire prongs 29 which project beyond the end of the bar 26 and which are so spaced as to have interfitting relation with the prongs 17 when the sweep is rotated as will be described.

Co-operating with the door 25 for closing the front of the cage is a lower or auxiliary door 30 carried by a rock shaft 31 journaled immediately above the base 10. Secured to one end of this rock shaft is a spiral spring 32 which has its other end secured to the side of the cage and which is for the purpose of normally holding the door 30 closed. The base may be recessed as shown at 33 to accommodate the door 30 when the latter is swung to open position, it being necessary that this door 30 be in nonobstructing relation to the sweep when the trap is sprung.

Rising from the forward end of the base is a housing 34 within which is pivoted, at 35, an angle lever 36 which has one end prolonged and extending toward the front of the casing to constitute a treadle 37 upon which is mounted a bait pan 38. The base is recessed at 39 to receive the free end of the treadle and the bait pan when the treadle is depressed. It is intended that the pan be filled with cheese or other bait attractive to whatever animal is to be trapped and the top of the holder may be covered with wire screen or the like to prevent the bait from being shaken out when the trap is in operation. The purpose of recessing the base to receive the pan is to remove this pan from the path of travel of the sweep when the latter is rotated. Pivoted at 40 in the housing 34 is a catch lever 41 having an inclined edge 42 and retaining shoulder 43 which is normally engaged by the lip 27 on the bar 26 for holding the trap set. The bait treadle is pivotally connected with the lower end of the lever 41 as shown at 44. Secured within the housing is a leaf spring 45 which is curved as shown and which has its upper end engaging within a notch 46 in the rear edge of the lever 41.

The automatic locking means for discontinuing the operation of the trap when the main spring has run down consists of a gear 47 journaled upon one side of the cage and meshing with a pinion 48 on the shaft 18, the ratio of this gear and pinion being such that the gear will make one revolution when the trap has operated the maximum number of times intended. Carried by the gear 47 is an arm 49, the free end of which is engageable with a crank 50 formed on one end of the shaft 31 for holding the door 30 and in fact all of the parts against operation.

The normal position of the parts is such that the door 25 engages against the outside of the door 30 and co-operates therewith for closing the front end of the cage, while the door 24 closes the opening 16 in the top. The main spring 20 is under tension and the lip 27 on the sweep arm is in engagement with the shoulder 43 of the catch lever. Assuming that the bait pan contains suitable bait, it will be seen that a mouse, rat or other animal to be caught will be attracted by the bait and will undoubtedly step upon the treadle 37. When this occurs the weight of the animal upon this treadle causes swinging movement of the angle lever 36 and consequent outward swinging movement of the catch lever 41 against the resistance of the spring 45. As the lever 41 thus moves, the shoulder 43 will be moved out of engagement with the lip 27 and there is then nothing to oppose movement of the shaft 18 under the influence of the spring tension exerted thereon by the spiral spring 20. The result is that this shaft 18 rotates very rapidly, the sweep arm swinging downwardly and knocking the animal into the cage. The engagement of the door 25 with the door 30 swings the latter to open position so that it will not interfere with the sweep arm. The animal thus knocked into the cage will remain therein while the sweep arm will continue rotating until it has made one complete revolution whereupon the lip 27 thereon will re-engage the shoulder 43 and hold the parts set ready for subsequent operation.

At every complete revolution of the shaft 18, that is every time the trap is sprung, the rotation of the pinion 48 will move the gear 47 one step and when the trap has been sprung the maximum number of times for which the trap is built to be operated, the gear 47 will have been turned one complete revolution and the arm 49 thereon will engage the crank arm 50 so that further rotation of the gear and consequently an additional operation or springing of the trap will be prevented. It will be seen that every time an animal is caught the trap automatically resets itself, the only attention necessary being that the spring 20 must be placed under tension to render the device ready for operation. When a sufficient number of animals have accumulated within the cage the back door 12 thereof may be opened to permit removal of the animals into a storage cage in case the animals are desirable to keep or they may be dumped into a receptacle of water to affect drowning.

From the foregoing description and a study of the drawing it will be apparent that I have thus provided a simple and inexpensive trap which will be highly efficient and which will be particularly advantageous as requiring no attention. Owing to the simplicity of the construction and the fewness of the parts it is apparent that there is but little to get out of order so that the device should have a long life and satisfactorily perform all of its functions.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. In a trap, a cage having a portion of its top and its front end open, a shaft journaled transversely of the cage at the top of the open front, a spiral spring normally holding said shaft under tension, right angularly disposed door members carried by the shaft and respectively closing the open front and the opening in the top, a sweep arm carried by the shaft, and means normally holding the shaft against rotation, consisting of a spring catch and a bait-carrying-treadle-operated releasing means for releasing the catch, and an outwardly spring pressed auxiliary door pivotally mounted at the bottom of the open front of the cage and co-operating with the first named door.

2. In a trap, a cage having a portion of its top and its front end open, a shaft journaled transversely of the cage at the top of the open front, a spiral spring normally holding said shaft under tension, right angularly disposed door members carried by the shaft and respectively closing the open front and the opening in the top, a sweep arm carried by the shaft, and means normally holding the shaft against rotation, consisting of a housing rising from the base, a catch lever pivoted within said housing and having a stop shoulder at its upper end normally engaging the free end of the sweep arm, an angle lever pivoted within said housing and having one arm arranged in upright position and pivotally connected with said catch lever, the other arm of the angle lever being horizontally disposed and prolonged to define a treadle, and a bait holder on said treadle.

3. In a trap, a cage having a portion of its top and its front end open, a shaft journaled transversely of the cage at the top of the open front, a spiral spring normally holding said shaft under tension, right angularly disposed door members carried by the shaft and respectively closing the open front and the opening in the top, a swingable auxiliary door engaging and movable by said doors a sweep arm carried by the shaft, means normally holding the shaft against rotation, consisting of a spring catch and a bait-carrying treadle, means for releasing the catch, and means for locking the auxiliary door and consequently the entire mechanism against movement when the trap has been sprung a certain number of times.

4. In a trap, a cage having a portion of its top and its front end open, a shaft journaled transversely of the cage at the top of the open front, a spiral spring normally holding said shaft under tension, right angularly disposed door members carried by the shaft and respectively closing the open front and the opening in the top, a swingable auxiliary door engaging and movable by either of the first named doors and mounted on a shaft having a crank arm, a sweep arm carried by the first named shaft, means normally holding the first named shaft against rotation, means for releasing the holding means, and means for locking the parts against movement when the trap has been sprung a certain number of times, comprising a pinion on said shaft, a gear journaled on the cage and meshing with said pinion and an arm carried by the gear and engageable with said crank arm for holding the auxiliary door stationary in the path of the first named doors.

In testimony whereof I affix my signature.

MIKE MATEJEWSKI.